US009801117B2

(12) United States Patent
Gaal et al.

(10) Patent No.: US 9,801,117 B2
(45) Date of Patent: Oct. 24, 2017

(54) METHOD AND APPARATUS FOR CHANNEL DISCOVERY IN COGNITIVE RADIO COMMUNICATIONS

(71) Applicant: Qualcomm Incorporated, San Diego, CA (US)

(72) Inventors: Peter Gaal, San Diego, CA (US); Alan Barbieri, San Diedo, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 13/621,758

(22) Filed: Sep. 17, 2012

(65) Prior Publication Data
US 2013/0070626 A1    Mar. 21, 2013

Related U.S. Application Data

(60) Provisional application No. 61/536,508, filed on Sep. 19, 2011.

(51) Int. Cl.
*H04L 1/00*       (2006.01)
*H04W 48/12*   (2009.01)
(Continued)

(52) U.S. Cl.
CPC ........... *H04W 48/12* (2013.01); *H04W 48/16* (2013.01); *H04W 16/14* (2013.01)

(58) Field of Classification Search
None
See application file for complete search history.

(56) References Cited

U.S. PATENT DOCUMENTS 6,898,197 B1 *  5/2005  Lavean ............... H04B 1/707
                                                            342/357.64
8,290,503 B2   10/2012  Sadek et al.
(Continued)

FOREIGN PATENT DOCUMENTS

CN         102100016 A      6/2011
WO     WO-2009084931 A1    7/2009
(Continued)

OTHER PUBLICATIONS

International Search Report and Written Opinion—PCT/US2012/055946—ISA/EPO—Dec. 11, 2012.
(Continued)

*Primary Examiner* — Kwang B Yao
*Assistant Examiner* — Hardikkumar Patel
(74) *Attorney, Agent, or Firm* — Harrity & Harrity, LLP

(57) ABSTRACT

Techniques are provided for channel discovery. For example, there is provided a method operable by a mobile entity that may involve measuring beacon signals associated with the network. In one approach, the method may involve, in response to detecting an Authorized Shared Access (ASA) beacon signal on a frequency common to each network entity on a given ASA channel, extracting frequency information from the ASA beacon signal, wherein the ASA beacon signal comprises a single frequency network (SFN) beacon signal. In another approach, the method may involve, in response to detecting an ASA beacon signal on a frequency common to each network entity on a given ASA channel, extract frequency information from the ASA beacon signal, wherein timing correlates with an operating frequency for the ASA beacon signal.

34 Claims, 12 Drawing Sheets

(51) Int. Cl.
*H04W 48/16* (2009.01)
*H04W 16/14* (2009.01)

(56) References Cited

U.S. PATENT DOCUMENTS

| | | | | |
|---|---|---|---|---|
| 2006/0146769 | A1* | 7/2006 | Patel | H04W 52/0229 370/338 |
| 2008/0062933 | A1* | 3/2008 | Liu | H04W 48/12 370/332 |
| 2010/0015921 | A1* | 1/2010 | Yavuz | H04W 72/085 455/63.1 |
| 2010/0111150 | A1 | 5/2010 | Sorrells et al. | |
| 2010/0246506 | A1 | 9/2010 | Krishnaswamy | |
| 2010/0265871 | A1* | 10/2010 | Ko | H04W 16/14 370/315 |
| 2010/0296429 | A1 | 11/2010 | Han et al. | |
| 2011/0243078 | A1 | 10/2011 | Kim et al. | |
| 2011/0319129 | A1 | 12/2011 | Bhat et al. | |
| 2012/0026941 | A1* | 2/2012 | Ahmad | H04W 48/16 370/328 |
| 2012/0039284 | A1 | 2/2012 | Barbieri et al. | |
| 2012/0134328 | A1 | 5/2012 | Gauvreau et al. | |
| 2013/0156005 | A1* | 6/2013 | Li | H04L 5/001 370/331 |

FOREIGN PATENT DOCUMENTS

| | | | | |
|---|---|---|---|---|
| WO | WO 2010111150 | A2 * | 9/2010 | H04W 72/085 |
| WO | 2011106538 | A1 | 9/2011 | |

OTHER PUBLICATIONS

"Reconfigurable Radio Systems (RRS); Use Cases for Operation in White Space Frequency Bands", ETSI Draft; 01004V017, European Telecommunications Standards Institute (ETSI), 650, Route Des Lucioles; F-06921 Sophia-Antipolis; France, No. V0.1.7, Sep. 12, 2011 (Sep. 12, 2011), pp. 1-60, XP014067100, [retrieved on Sep. 12, 2011].

* cited by examiner

METHOD AND APPARATUS FOR CHANNEL DISCOVERY IN COGNITIVE RADIO COMMUNICATIONS

CROSS-REFERENCE TO RELATED APPLICATION

The present Application for Patent claims priority to Provisional Application No. 61/536,508, filed Sep. 19, 2011, entitled "METHOD AND APPARATUS FOR CHANNEL DISCOVERY IN COGNITIVE RADIO COMMUNICATIONS", and is assigned to the assignee hereof, and is hereby expressly incorporated in its entirety by reference herein.

BACKGROUND

Field

The present disclosure relates to wireless communication systems, and more particularly, to techniques for channel discovery in cognitive radio networks.

Background

Wireless communication systems are widely deployed to provide various types of communication content such as voice, data, video and the like, and deployments are likely to increase with introduction of new data oriented systems, such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems and other orthogonal frequency division multiple access (OFDMA) systems.

3GPP LTE represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for a number of mobile entities, such as, for example, user equipments (UEs) or access terminals (ATs). A UE may communicate with a base station via the downlink and uplink. The downlink (or forward link) refers to the communication link from the base station to the UE, and the uplink (or reverse link) refers to the communication link from the UE to the base station. Such communication links may be established via a single-in-single-out, multiple-in-signal-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point. Next generation systems, such as LTE, allow for use of MIMO technology for enhanced performance and data throughput.

As the number of entities deployed increases, the need for proper bandwidth utilization on licensed as well as unlicensed RF spectrum becomes more important. In the context of cognitive radio networks, certain frequency bands may be underutilized by an incumbent primary licensee. Such frequency bands may be made available to secondary users (e.g. cellular operators) when the primary user is not active. Due to changes in primary user activity, changing the operating frequency for the secondary licensees may be necessary. In the case when there are many potential candidate operating channels and the channel list provided by the system information in the current serving cell is not accurate, the UE has to measure many candidate channels, which may increase delay and/or reduce the battery life of the UE. Accordingly, there is a need for efficient channel discovery in cognitive LTE networks and the like.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a channel discovery method operable by a mobile entity (e.g., a UE or the like). In one example, the method may involve measuring beacon signals associated with the network. The method may further involve, in response to detecting an Authorized Shared Access (ASA) beacon signal on a frequency common to each network entity on a given ASA channel, extracting frequency information from the ASA beacon signal, wherein the ASA beacon signal comprises a single frequency network (SFN) beacon signal.

In another example, the channel discovery method may involve having the mobile entity measure beacon signals associated with the network, and in response to detecting an ASA beacon signal on a frequency common to each network entity on a given ASA channel, extract frequency information from the ASA beacon signal, wherein timing correlates with an operating frequency for the ASA beacon signal. In related aspects, an electronic device (e.g., a UE or component(s) thereof) may be configured to execute the above-described methodologies.

In accordance with one or more aspects of the embodiments described herein, there is provided a channel discovery method operable by a network entity (e.g., an eNB or the like). In one example, the method may involve transmitting a beacon signal indicative of an operating frequency of the network entity, wherein the beacon signal comprises an SFN beacon signal. In related aspects, the beacon signal may not be indicative of a cell ID for the network entity. In further related aspects, the beacon signal comprises an ASA beacon signal on a frequency common to each network entity on an ASA channel. In yet further related aspects, the common frequency comprises one of a licensed frequency or a designated ASA frequency.

In another example, the channel discovery method may involve having the network entity transmit a beacon signal indicative of an operating frequency of the network entity, wherein timing correlates with an operating frequency for an ASA channel associated with the beacon signal. In yet another example, the channel discovery method may involve having the network entity transmit a beacon signal indicative of an operating frequency of the network entity, wherein a beacon frequency tone location correlates with an operating frequency for an ASA channel associated with the beacon signal. In related aspects, an electronic device (e.g., an eNB or component(s) thereof) may be configured to execute the above-described methodologies.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Techniques for supporting cognitive radio communication are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below. The word "exemplary" is used herein to mean "serving as an example, instance, or illustration." Any embodiment described herein as "exemplary" is not necessarily to be construed as preferred or advantageous over other embodiments.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
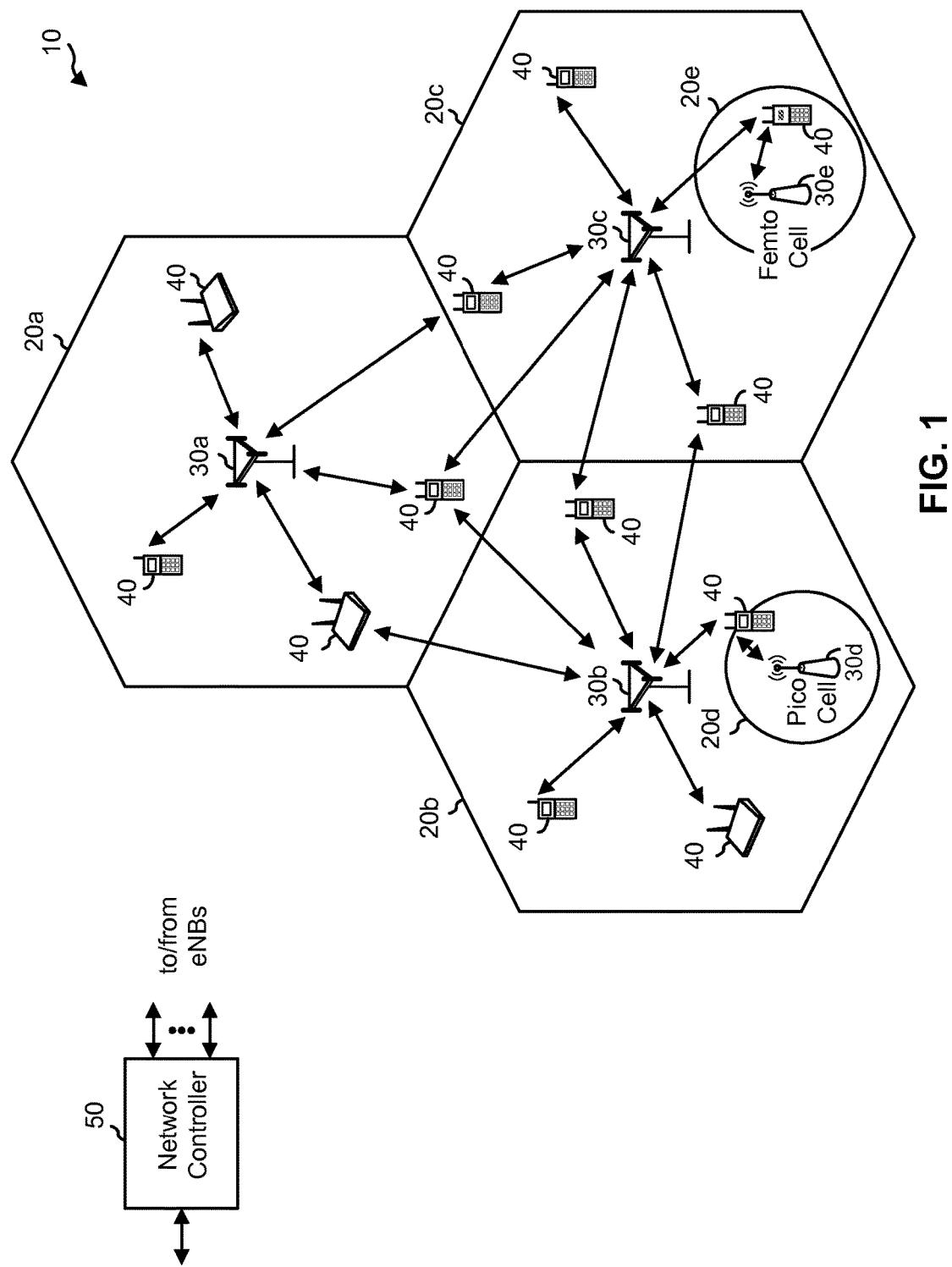
FIG. 1 is a block diagram conceptually illustrating an example of a telecommunications system.

FIG. 1 shows a wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a pico cell 20d. An eNB 30e may be a femto eNB or femto access point (FAP) for a femto cell 20e.

Wireless network 10 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may be a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink (DL) and uplink (UL). A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the DL carrier.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods. In related aspects, the FAP synchronization algorithm described in further detail below may be applied to the FAPs using FDD or TDD duplexing.

Figure 2:
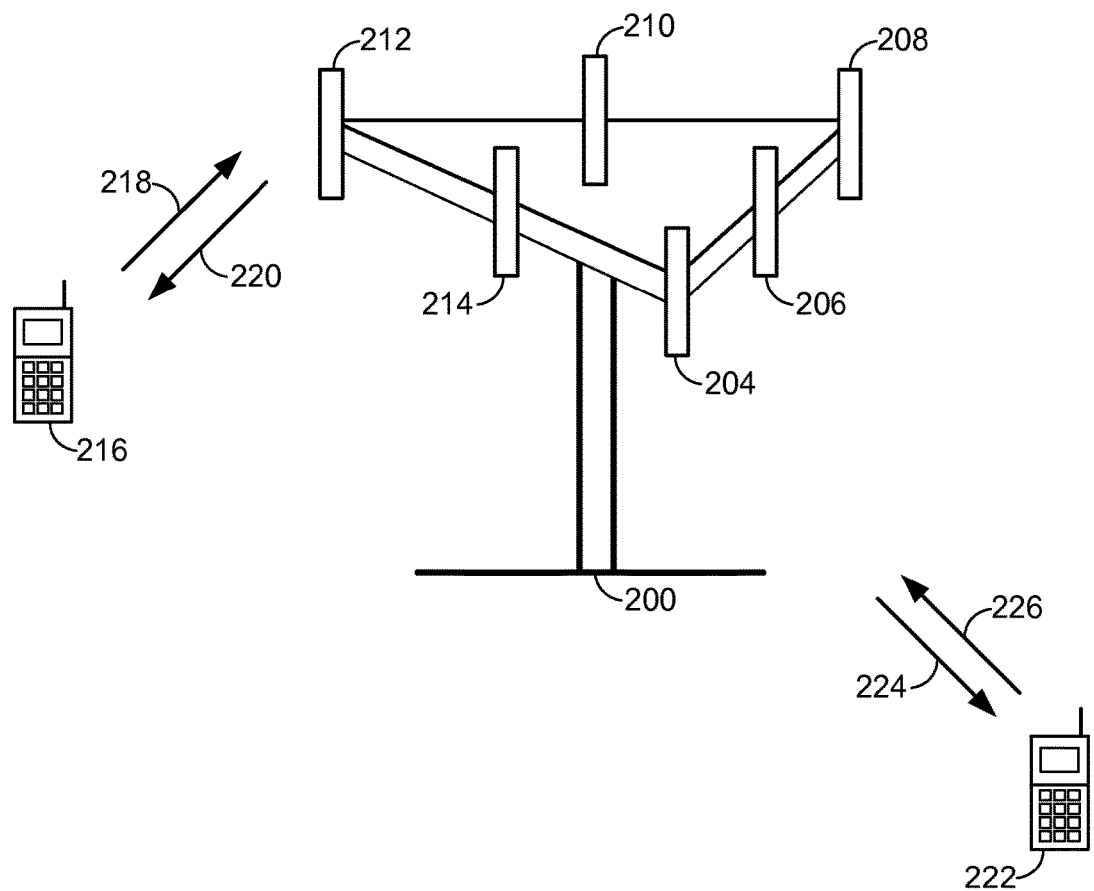
FIG. 2 illustrates details of a wireless communications system including an evolved Node B (eNB) and multiple user equipments (UEs).

Referring now to FIG. 2, a multiple access wireless communication system according to one aspect is illustrated. An access point or eNB 200 includes multiple antenna groups, one including 204 and 206, another including 208 and 210, and an additional including 212 and 214. In FIG. 2, only two antennas are shown for each antenna group, however, more or fewer antennas may be utilized for each antenna group. Access terminal or UE 216 is in communication with antennas 212 and 214, where antennas 212 and 214 transmit information to access terminal 216 over forward link 220 and receive information from access terminal 216 over reverse link 218. Access terminal 222 is in communication with antennas 206 and 208, where antennas 206 and 208 transmit information to access terminal 222 over forward link 226 and receive information from access terminal 222 over reverse link 224. In a FDD system, communication links 218, 220, 224 and 226 may use different frequencies for communication. For example, forward link 220 may use a different frequency then that used by reverse link 218.

Each group of antennas and/or the area in which they are designed to communicate is often referred to as a sector of the access point. Antenna groups each are designed to communicate to access terminals in a sector, of the areas covered by access point 200. In communication over forward links 220 and 226, the transmitting antennas of access point 200 may utilize beam-forming in order to improve the signal-to-noise ratio of forward links for the different access terminals 216 and 224. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, evolved Node B (eNB) or some other terminology. An access terminal may also be called an access terminal, user equipment (UE), a wireless communication device, terminal, access terminal or some other terminology.

In accordance with aspects of the subject of this disclosure, cognitive radio refers generally to wireless communication systems where either a wireless network or network node includes intelligence to adjust and change transmission and/or reception parameters to provide efficient communication, while avoiding interference with other licensed or unlicensed users. Implementation of this approach includes active monitoring and sensing of the operational radio environment, which may include frequency spectrum, modulation characteristics, user behavior, network state, and/or other parameters. Multiple-access systems, such as LTE and LTE-A systems, may use cognitive radio techniques to utilize additional available spectrum beyond the specifically licensed spectrum.

Spectrum sensing involves detection of potentially usable spectrum. Once usable spectrum is detected, it may then be used either alone (if unoccupied) or shared, assuming other users are present, without causing harmful interference. Nodes in cognitive radio systems may be configured to sense spectrum holes, which may be based on detecting primary users (such as, for example, licensed users of the shared spectrum), or other users (such as, for example, unlicensed users). Once usable spectrum is selected, it may then be further monitored to detect use by others. For other higher priority users, the spectrum may need to be vacated and communications transferred to other channels. For example, if a primary user is detected during initial search, an unlicensed user may be prohibited from using the spectrum. Likewise, if a primary user appears in spectrum being used by an unlicensed user, the unlicensed user may need to vacate.

Spectrum sensing techniques can include transmitter detection, where cognitive radio nodes have the capability to determine if a signal from a primary user is locally present in a certain spectrum. This may be done by techniques such as matched filter/correlation detection, energy or signal level detection, cyclostationary feature detection, or other techniques. A primary user may be a higher priority user, such as a licensed user of shared spectrum which unlicensed users may also use.

Cooperative detection may also be used in some cases where multiple network nodes are in communication. This approach relates to spectrum sensing methods where information from multiple cognitive radio users is incorporated for primary user detection. Interference-based or other detection methods may likewise be used to sense available spectrum.

Cognitive radio systems generally include functionality to determine the best available spectrum to meet user and/or network communication requirements. For example, cognitive radios may decide on the best spectrum band to meet specific Quality of Service (QoS), data rate requirements, or other requirements over available spectrum bands. This requires associated spectrum management and control functions, which may include spectrum analysis as well as spectrum decision processing to select and allocate available spectrum.

Because the spectrum is typically shared, spectrum mobility is also a concern. Spectrum mobility relates to a cognitive network user changing operational frequency. This is generally done in a dynamic manner by allowing network nodes to operate in the best available frequency band, and maintaining seamless communications during the transition to other/better spectrum. Spectrum sharing relates to providing a fair spectrum scheduling method, which can be regarded as similar to generic media access control (MAC) problems in existing networks.

One aspect of cognitive radio relates to sharing use of licensed spectrum by unlicensed users. Use of this spectrum may be integrated with other wireless communication methodologies, such as LTE.

White spaces (WS) refer to frequencies allocated to a broadcasting service or other licensed user that are not used locally, as well as to interstitial bands. In the United States, the switchover to digital television in 2009 created abandoned spectrum in the upper 700 megahertz band (698 to 806 MHz), and additional whitespace is present at 54-698 MHz (TV Channels 2-51) which is still in use for digital television. Incumbent primary users may include licensed television broadcasters on existing channels, wireless microphone systems, medical devices, or other legacy devices. In 2008, the United States Federal Communications Commission (FCC) approved unlicensed use of this white space. However, these so-called "TV Band Devices," must operate in the vacant channels or white spaces between television channels in the range of 54 to 698 MHz.

Rules defining these devices were published by the U.S. Federal Communications Commission (FCC) in a Second Report and Order on Nov. 14, 2008. The FCC rules define fixed and personal/portable devices. Fixed devices may use any of the vacant US TV channels 2, 5-36 and 38-51 with a power of up to 1 watt (4 watts EIRP). They may communicate with each other on any of these channels, and also with personal/portable devices in the TV channels 21 through 51. Fixed devices must be location-aware, query an FCC-mandated database at least daily to retrieve a list of usable channels at their location, and must also monitor the spectrum locally once every minute to confirm that no legacy wireless microphones, video assist devices, or other emitters are present. If a single transmission is detected, the device may not transmit anywhere within the entire 6 MHz channel in which the transmission was received. Fixed devices may transmit only within the TV channels where both the database indicates operation is permissible, and no signals are detected locally.

Personal/portable stations may operate only on channels 21-36 and 38-51, with a power of 100 mW EIRP, or 40 mW if on a channel adjacent to a nearby television channel. They may either retrieve a list of permissible channels from an associated fixed station, or may accept a lower output power of 50 mW EIRP and use only spectrum sensing.

As noted previously, existing wireless networks may be enhanced by addition of cognitive radio functionality. In one aspect, an LTE system may include cognitive radio functionality as further illustrated below.

Figure 3:
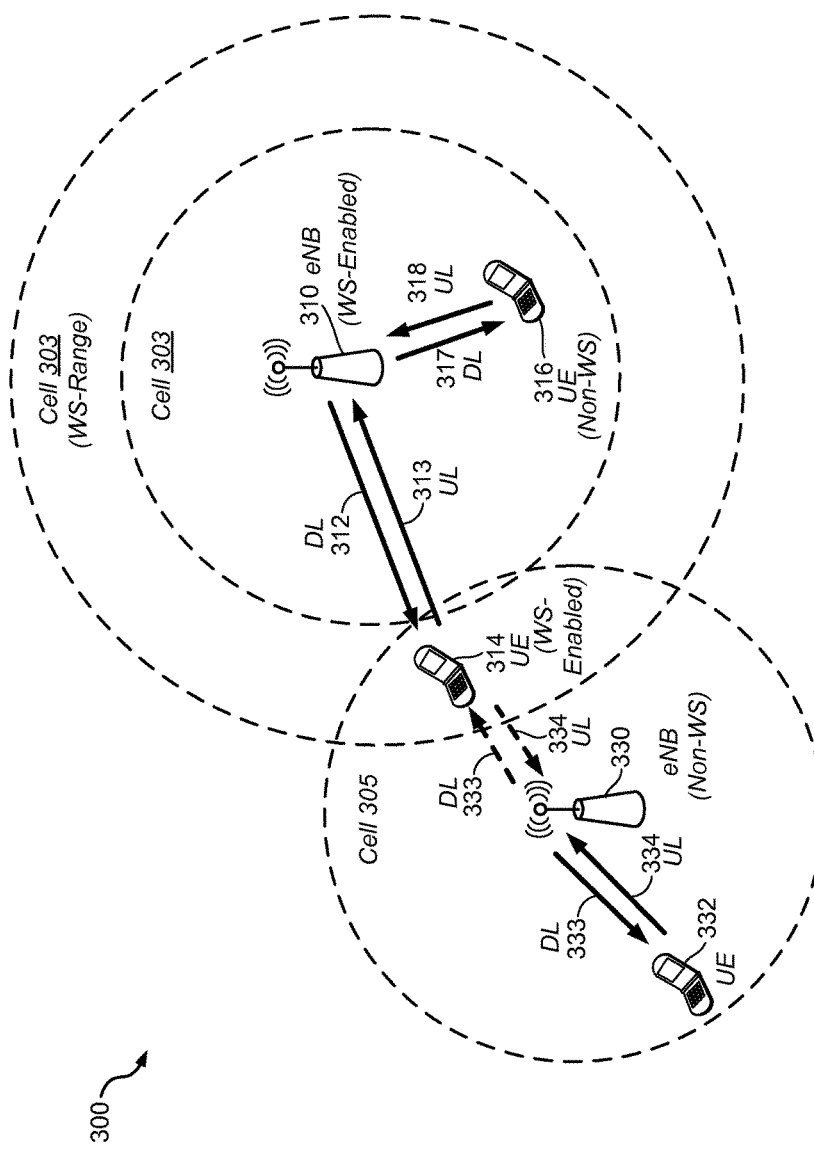
FIG. 3 illustrates a cognitive radio system using white space (WS).

Attention is now directed to FIG. 3, which illustrates an example of a cognitive LTE system 300 configured to utilize white spaces (WS), such as in the UHF television spectrum. A first cell 303 is configured to utilize WS on one or both of the DL and UL. In one implementation, licensed spectrum is used for the UL, while WS may be used for the DL for certain communications. For example, a WS-enabled eNB 310 may be in communication with a first UE 316 as well as a second UE 314. UE 316 may be a non-WS enabled UE, whereas UE 314 may be WS-enabled (as used herein, WS-enabled refers to a network device configured to utilize white space, typically in addition to licensed spectrum). In the example, DL 317 and UL 318, between eNB 310 and UE 316, are configured to use licensed spectrum, whereas DL 312, between eNB 310 and UE 314, may be configured to use WS, while UL 313 may be configured to use licensed spectrum.

Another cell 305 may be adjacent to cell 303 and may be configured with an eNB 330 to communicate with UE 332 using licensed spectrum for DL 333 and UL 334. In some situations, UE 314 may be within range of eNB 330 and as such may be subject to attempts by UE 314 to access eNB 330.

As noted previously, use of WS by devices in cognitive networks requires sensing of channel conditions. In systems such as LTE systems configured to operate in TV band WS, FCC requirements mandate monitoring the spectrum being utilized by a secondary device (i.e., a non-licensed user) for primary uses and vacation of the channel if a primary user is detected. Typical primary uses may be UHF television channels, wireless microphones, or other legacy devices.

In addition, coordination with other secondary users may be desirable to facilitate frequency sharing. FCC requirements mandate checking the channel for 30 second before switching to a new channel, monitoring channels at least every 60 seconds for primary users, and vacating the channel within two second when a primary user is detected. During checking, a quiet period is required in which no signal transmission of any network device is done. For example, in an LTE network having an eNB and three associated UEs, all four of these devices must refrain from transmitting during the quiet period so that other users may be detected.

Figure 4:
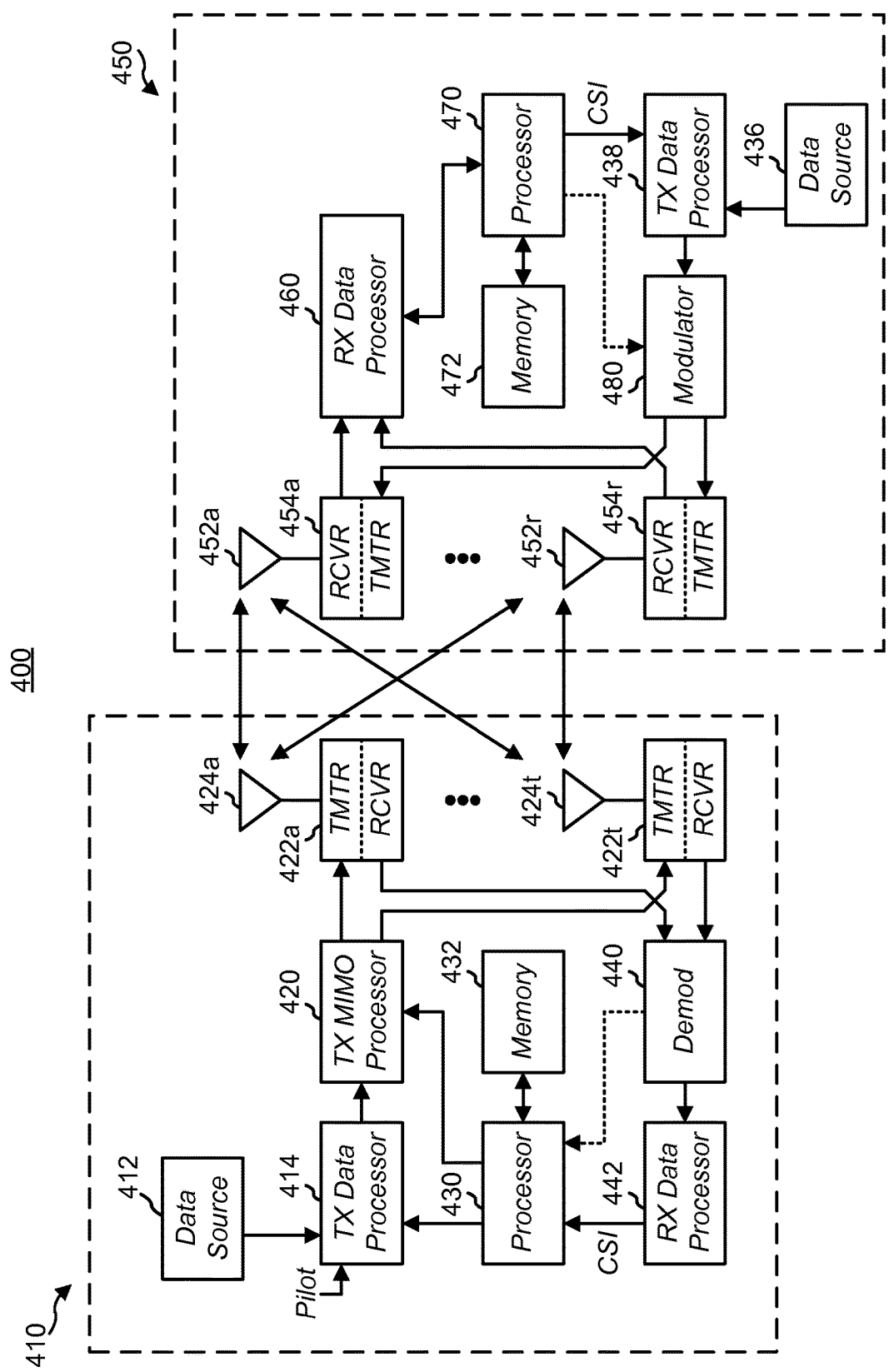
FIG. 4 illustrates details an embodiment of a cognitive network including a UE and eNB which may be WS-enabled.

Attention is now directed to FIG. 4, which illustrates a system 400 including a transmitter system 410 (also known as the access point or eNB) and a receiver system 450 (also known as access terminal or UE) in an LTE MIMO system 400. In the present disclosure, the transmitter system 410 may correspond to a WS-enabled eNB or the like, whereas the receiver system 450 may correspond to a WS-enabled UE or the like.

At the transmitter system 410, traffic data for a number of data streams is provided from a data source 412 to a transmit (TX) data processor 414. Each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430.

The modulation symbols for all data streams are then provided to a TX MIMO processor 420, which may further process the modulation symbols (e.g., for OFDM). TX MIMO processor 420 then provides NT modulation symbol streams to NT transmitters (TMTR) 422a through 422t. In certain embodiments, TX MIMO processor 420 applies beam-forming weights to the symbols of the data streams and to the antenna from which the symbol is being transmitted.

Each transmitter 422 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 422a through 422t are then transmitted from NT antennas 424a through 424t, respectively.

At receiver system 450, the transmitted modulated signals are received by NR antennas 452a through 452r and the received signal from each antenna 452 is provided to a respective receiver (RCVR) 454a through 454r. Each receiver 454 conditions (e.g., filters, amplifies, and down-converts) a respective received signal, digitizes the conditioned signal to provide samples, and further processes the samples to provide a corresponding "received" symbol stream.

An RX data processor 460 then receives and processes the NR received symbol streams from NR receivers 454 based on a particular receiver processing technique to provide NT "detected" symbol streams. The RX data processor 460 then demodulates, de-interleaves, and decodes each detected symbol stream to recover the traffic data for the data stream. The processing by RX data processor 460 is complementary to that performed by TX MIMO processor 420 and TX data processor 414 at transmitter system 410.

A processor 470 periodically determines which pre-coding matrix to use (discussed below). Processor 470 formulates a reverse link message comprising a matrix index portion and a rank value portion. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beam-forming weights then processes the extracted message.

Channel Discovery For Cognitive Radio: In accordance with aspects of the subject of this disclosure, network entities, such as base stations (e.g., eNBs) may transmit a single frequency network (SFN) beacon signal on a frequency other than their own operating frequency. For example, the resource (i.e., time, frequency) of the beacon signal may be common for those eNBs operating on a given frequency with a given public land mobile network (PLMN). The UE may estimate the expected signal level and choose the best candidate frequency on which to perform inter-frequency measurements. The UE may also estimate the expected interference by measuring beacons corresponding to other PLMN(s). Accordingly, the present technique makes it possible to accommodate beacon signals with reduced overhead, as compared to existing channel discovery techniques.

In related aspects, the beacon signal may include authorized shared access (ASA) beacon signals for the purpose of opening up spectrum (e.g., white space) that may be under-utilized by an existing owner/licensee. ASA has certain features that are similar to TV white space (TVWS) (e.g., the existence of primary users); however, there is a limit to the number of entities (operators) accessing the spectrum in ASA. The spectrum may be shared between a primary/incumbent user (e.g., a government agency) and a secondary user (e.g., cellular operator(s)). The spectrum may be further shared among secondary users.

ASA Channel Discovery: The UE may first access the system on a licensed channel. At a certain point, the UE may need to find out which ASA channels are available. However, there may be many ASA channels available (e.g., there are forty-six possible TVWS channels), and it may take a long time to search all of the available ASA channels. In one embodiment, the network entities (e.g., eNBs or the like) may broadcast a discovery signal (i.e., beacon) on a common frequency. For example, the common frequency may be licensed frequency. In another example, the common frequency may be a designated ASA frequency, wherein the UE may be informed about the designated channel number carrying the beacon(s).

Discovery Beacon Signal: The beacon may be any signal that the UE can measure. For example, an existing signal, such as, for example, a channel state information reference signal (CSI-RS), may be used for the beacon signal. Given that beacon overhead may be a concern, one approach is to use an SFN beacon. In related aspects, each eNB on a given ASA channel may transmit the same beacon signal. Transmission overlaps may result in reduced overhead. In further related aspects, each combination of an ASA channel and a PLMN may be associated with a set of resource elements on the designated beacon channel. Code division multiplexing (CDM-ing) of certain ASA channel beacons may also be possible. In frequency, the beacon signal need not occur in every resource block (RB), and resource reuse can be further increased. On the designated channel, corresponding PDSCH resource elements (REs) may be muted. It is noted that while individual eNBs may not be identifiable, the presence of the beacon signal on an ASA channel is.

Further with respect to beacon overhead, each eNB of a PLMN on a given ASA channel may use the same pseudo-random noise (PRN) sequence for the beacon. eNBs may randomly change phase in subsequent beacon transmissions in time. By transmitting the beacon signals with time delays, it is possible to reduce or minimize the possibility of two beacon signals cancelling each other (i.e., reduce the possibility of destructive combining) Still further with respect to beacon overhead, each eNB on a given ASA channel may use a different PRN sequence for the beacon. With this approach, destructive combining issues may be avoided, but there may be a lack of noise suppression capability.

With respect to eNB procedures for channel discovery, the eNBs may be without a spare Tx chain. A given eNB may periodically retune to its beacon channel for beacon transmission. The given eNB may configure a multi-media broadcast over a single frequency network (MBSFN) subframe in its own channel for the beacon period. However, such configuring of the MBSFN subframe is only needed if there is not enough returning time between its own channel CRS and the beacon transmission. The given eNB may receive beacon configuration(s) from an OAM (Operations, Administration, and Maintenance) entity or the like.

With respect to UE procedures for channel discovery, in one aspect, a UE may measure all beacons. In another aspect, the UE may sort the strongest beacons. The UE may also include the measured strength of other PLMN beacons corresponding to the same ASA frequency as a negative bias. In a further aspect, in connected mode, the UE may report the beacons measured. The UE may report beacon resource IDs and/or measured beacon strengths. The eNB may map beacon resource IDs to ASA channel numbers and/or may send an inter-frequency measurement request to the UE for best ASA channel candidates. The UE may perform inter-frequency measurements. In yet a further aspect, in idle mode, the UE may schedule ASA measurements based at least in part on the identified beacons. The system information may contain information on mapping of beacon resource IDs to ASA channels.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5A:
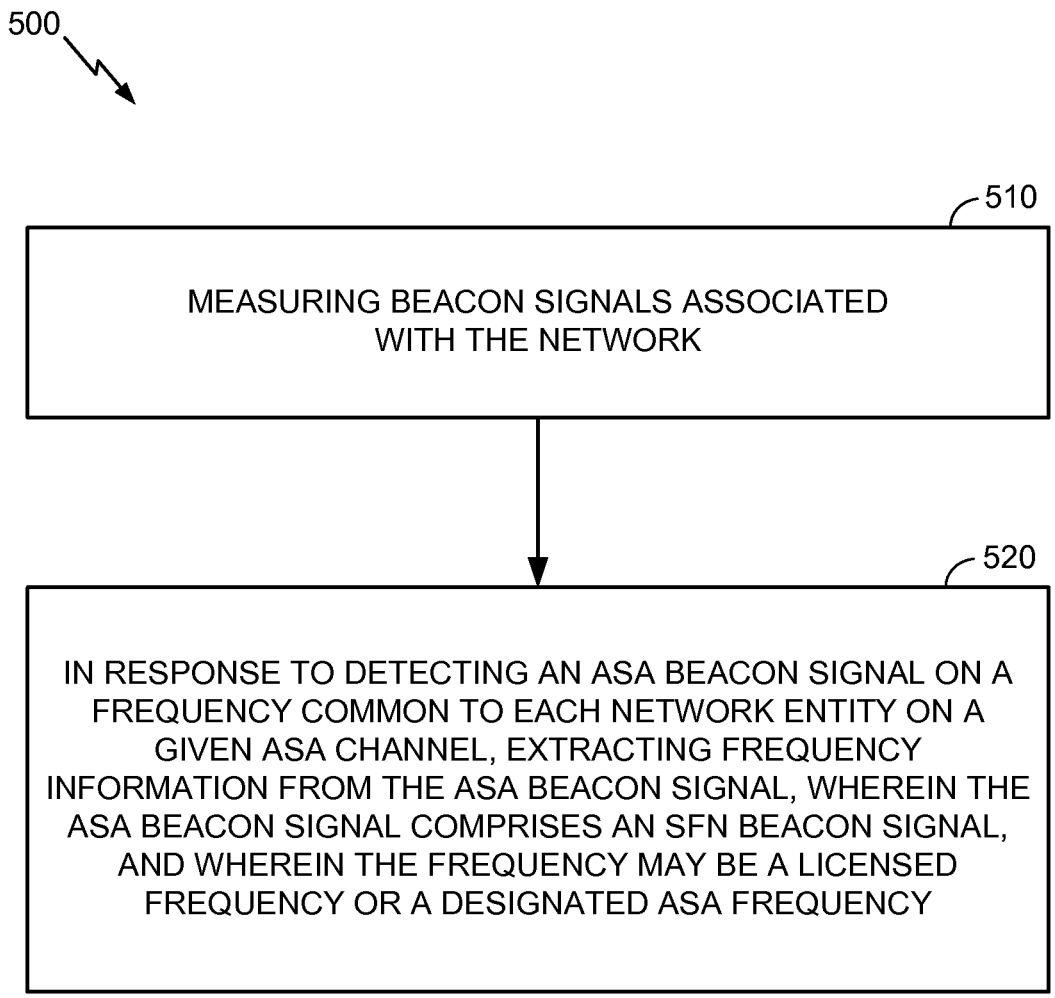
FIG. 5A illustrates an example channel discovery methodology executable by a mobile entity (e.g., a UE).

In accordance with one or more aspects of the embodiments described herein, with reference to FIG. 5A, there is shown a cognitive radio methodology 500, operable by a mobile entity (e.g., a UE or the like). Specifically, method 500 describes a way for the mobile entity to facilitate channel discovery in cognitive LTE or the like. The method 500 may involve, at 510, measuring beacon signals associated with the network. The method 500 may involve, at 520, in response to detecting an ASA beacon signal on a frequency common to each network entity on a given ASA channel, extracting frequency information from the ASA beacon signal, wherein the ASA beacon signal comprises an SFN beacon signal, and wherein the frequency may be a licensed frequency or a designated ASA frequency.

Figure 5B:
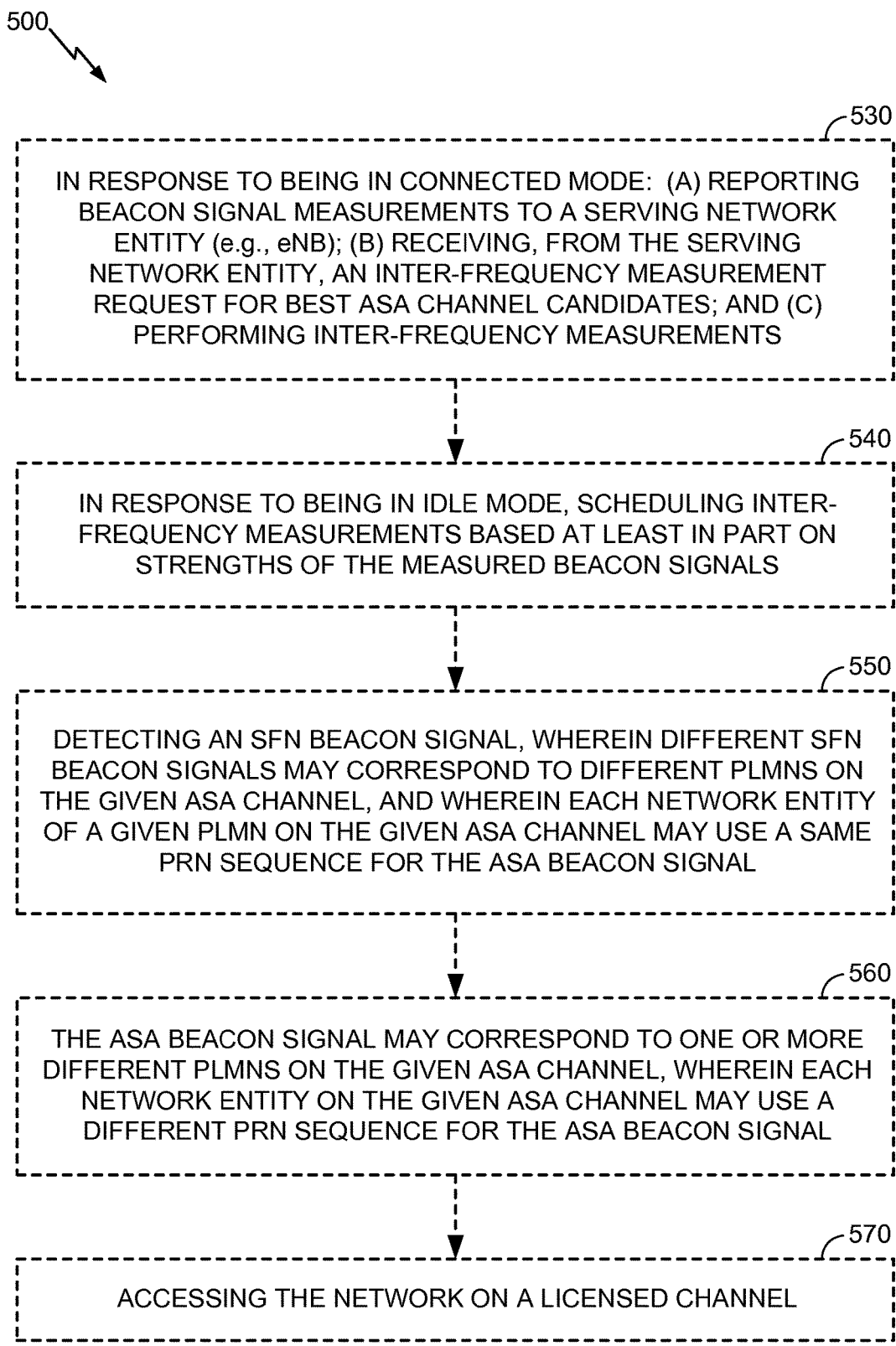
FIG. 5B illustrates further aspects of the methodology of FIG. 5A.

With reference to FIG. 5B, there are shown further operations or optional aspects of the method 500 that are optional and may be performed by a mobile entity or the like. If the method 500 includes at least one block of FIG. 5B, then the method 500 may terminate after the at least one block, without necessarily having to include any subsequent downstream block(s) that may be illustrated. It is further noted that numbers of the blocks do not imply a particular order in which the blocks may be performed according to the method 500. For example, the method 500 may involve, in response to being in connected mode: (a) reporting beacon signal measurements to a serving network entity (e.g., an eNB); (b) receiving, from the serving network entity, an inter-frequency measurement request for best ASA channel candidates; and (c) performing inter-frequency measurements (block 530). In the alternative, the method 500 may involve, in response to being in idle mode, scheduling inter-frequency measurements based at least in part on strengths of the measured beacon signals (block 540).

Detecting the ASA beacon signal (block 500) may involve detecting an SFN beacon signal, wherein different SFN beacon signals may correspond to different PLMNs on the given ASA channel, and wherein each network entity of a given PLMN on the given ASA channel may use a same PRN sequence for the ASA beacon signal (block 550). The ASA beacon signal may correspond to one or more different PLMNs on the given ASA channel, wherein each network entity on the given ASA channel may use a different PRN sequence for the ASA beacon signal (block 560). The method 500 may further involve accessing the network on a licensed channel (block 570).

Figure 6A:
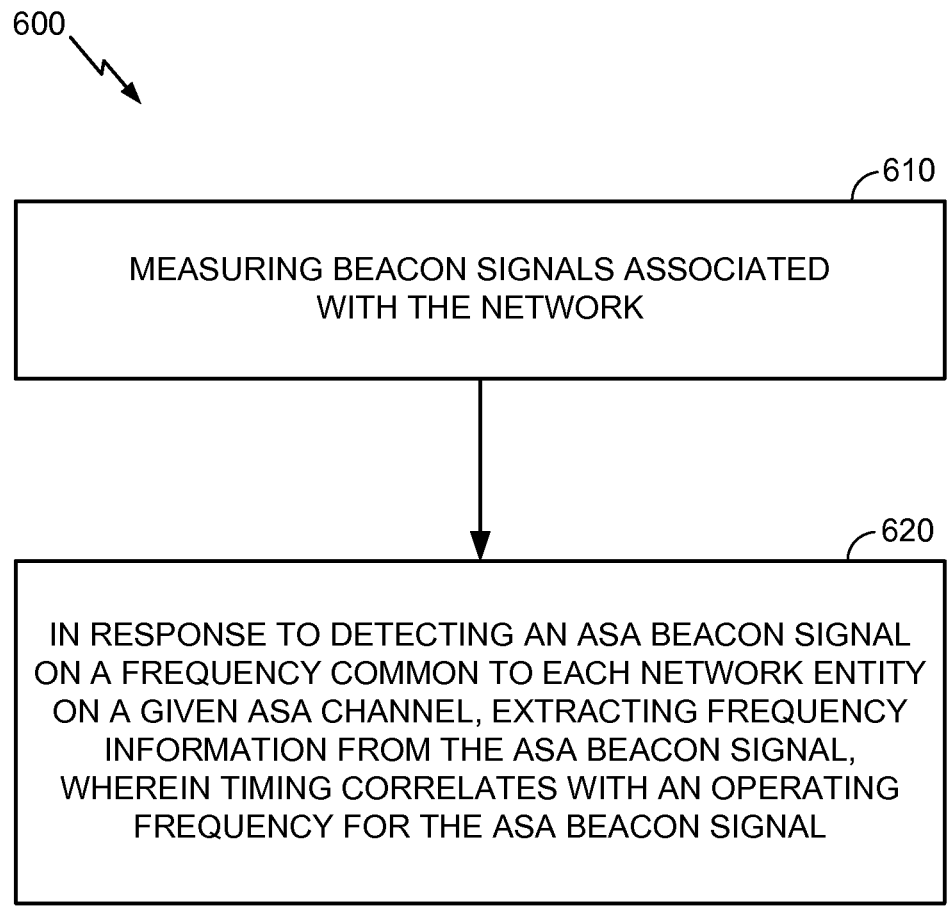
FIG. 6A illustrates another example channel discovery methodology executable by a mobile entity.

In another example, shown in FIG. 6A, there is provided a cognitive radio methodology 600, operable by a mobile entity. The method 600 may involve, at 610, measuring beacon signals associated with the network. The method 600 may involve, at 620, in response to detecting an ASA beacon signal on a frequency common to each network entity on a given ASA channel, extracting frequency information from the ASA beacon signal, wherein timing correlates with an operating frequency for the ASA beacon signal.

Figure 6B:
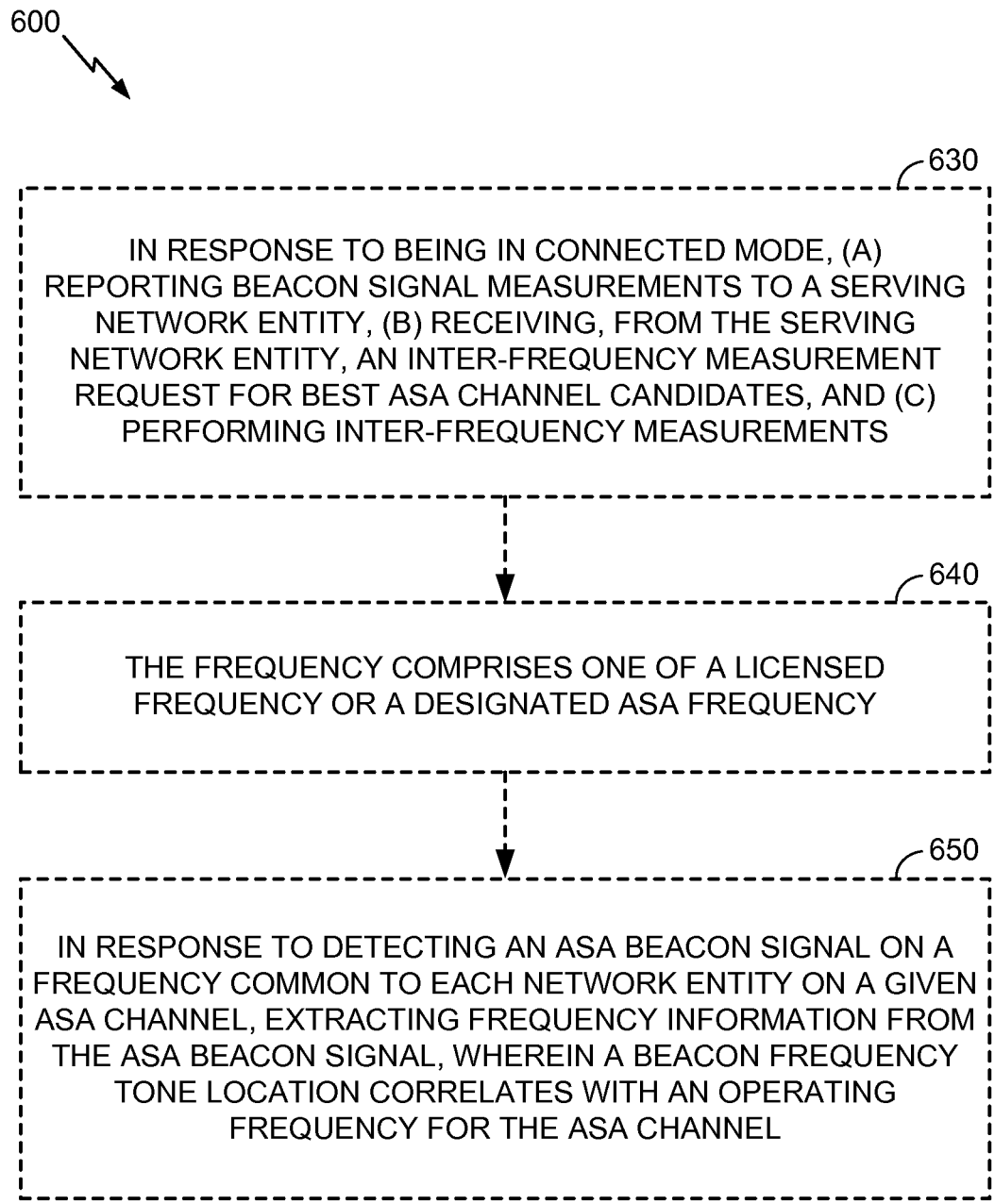
FIG. 6B illustrates further aspects of the methodology of FIG. 6A.

With reference to FIG. 6B, there are shown further operations or optional aspects of the method 600. The method 600 may involve, in response to being in connected mode, (a) reporting beacon signal measurements to a serving network entity, (b) receiving, from the serving network entity, an inter-frequency measurement request for best ASA channel candidates, and (c) performing inter-frequency measurements (block 630). The frequency comprises one of a licensed frequency or a designated ASA frequency (block 640). In lieu or in addition to block 620, the method 600 may involve, in response to detecting an ASA beacon signal on a frequency common to each network entity on a given ASA channel, extracting frequency information from the ASA beacon signal, wherein a beacon frequency tone location correlates with an operating frequency for the ASA channel (block 650).

Figure 7:
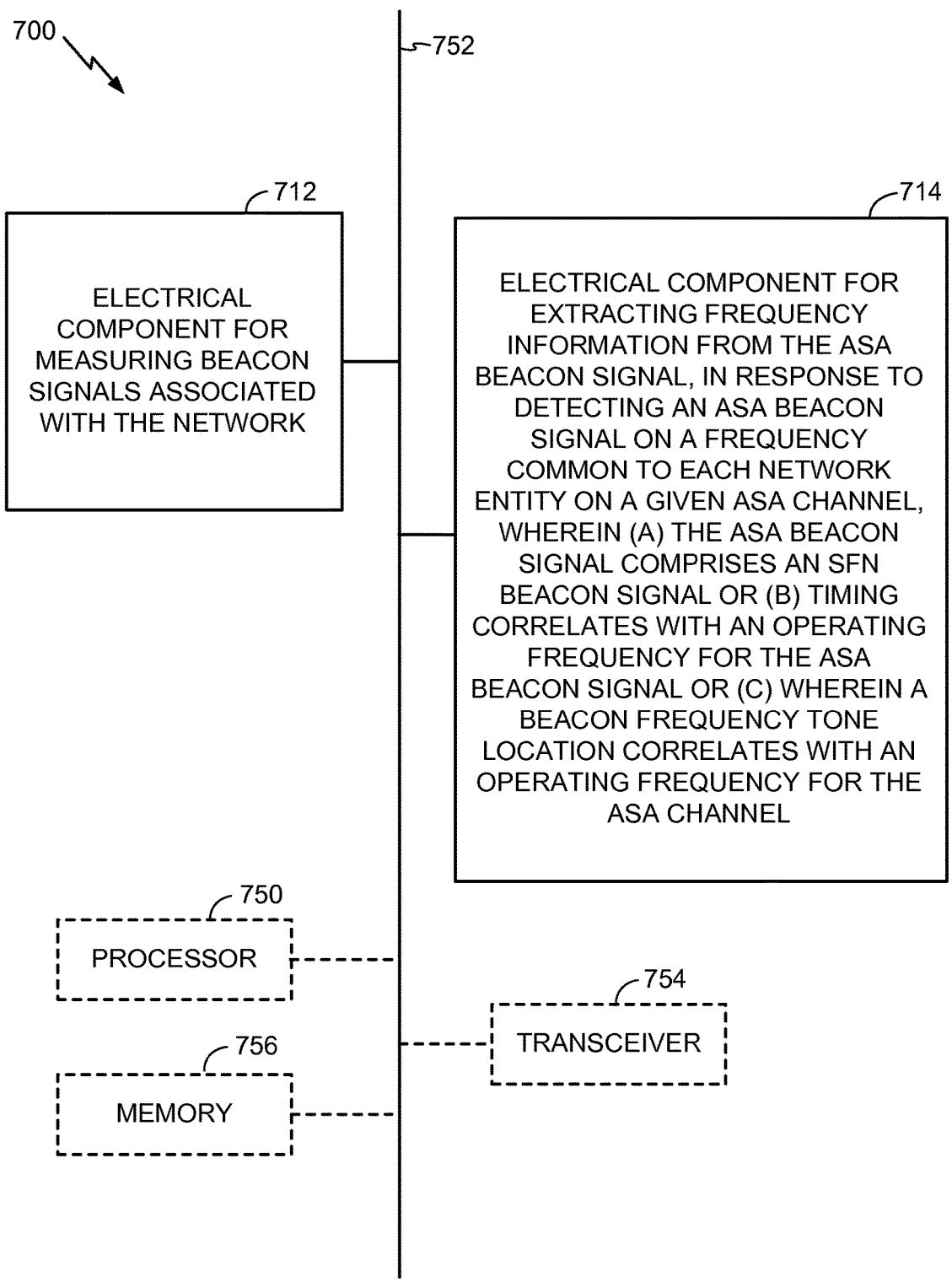
FIG. 7 shows an embodiment of an apparatus for channel discovery, in accordance with the methodologies of FIGS. 5A-B and 6A-B.

In accordance with one or more aspects of the embodiments described herein, there are provided devices and apparatuses for channel discovery, as described above with reference to FIGS. 5A-B and 6A-B. With reference to FIG. 7, there is provided an exemplary apparatus 700 that may be configured as a mobile entity (e.g., a UE), or as a processor or similar device/component for use within the mobile entity. The apparatus 700 may include functional blocks that can represent functions implemented by a processor, software, or combination thereof (e.g., firmware). For example, the apparatus 700 may include an electrical component or module 712 for measuring beacon signals associated with the network. The apparatus 700 may also include a component 714 for extracting frequency information from the ASA beacon signal, in response to detecting an ASA beacon signal on a frequency common to each network entity on a given ASA channel, wherein (a) the ASA beacon signal comprises an SFN beacon signal, (b) timing correlates with an operating frequency for the ASA beacon signal, or (c) wherein a beacon frequency tone location correlates with an operating frequency for the ASA channel.

In related aspects, the apparatus 700 may optionally include a processor component 750 having at least one processor, in the case of the apparatus 700 configured as a UE or the like, rather than as a processor. The processor 750, in such case, may be in operative communication with the components 712-714 via a bus 752 or similar communication coupling. The processor 750 may effect initiation and scheduling of the processes or functions performed by electrical components 712-714.

In further related aspects, the apparatus 700 may include a radio transceiver component 754. A stand alone receiver and/or stand alone transmitter may be used in lieu of or in conjunction with the transceiver 754. The apparatus 700 may optionally include a component for storing information, such as, for example, a memory device/component 756. The computer readable medium or the memory component 756 may be operatively coupled to the other components of the apparatus 700 via the bus 752 or the like. The memory component 756 may be adapted to store computer readable instructions and data for effecting the processes and behavior of the components 712-714, and subcomponents thereof, or the processor 750, or the methods disclosed herein. The memory component 756 may retain instructions for executing functions associated with the components 712-714. While shown as being external to the memory 756, it is to be understood that the components 712-714 can exist within the memory 756. It is further noted that the components in FIG. 7 may comprise processors, electronic devices, hardware devices, electronic sub-components, logical circuits, memories, software codes, firmware codes, etc., or any combination thereof.

Various additional modules and related components (not shown) may be incorporated in apparatus 700. For example, apparatus 700 may be configured consistently with the example WS-enabled UE 450 illustrated in FIG. 4. In related aspects, the components 712-714 may be part of the processor 470, the RX data processor 460, and/or the memory 472 of the WS-enabled UE 450. In further related aspects, the processor 470, the RX data processor 460, and/or the memory 472 may be configured to perform aspects of the methodologies described with reference to FIGS. 5A-B and 6A-B.

Figure 8:
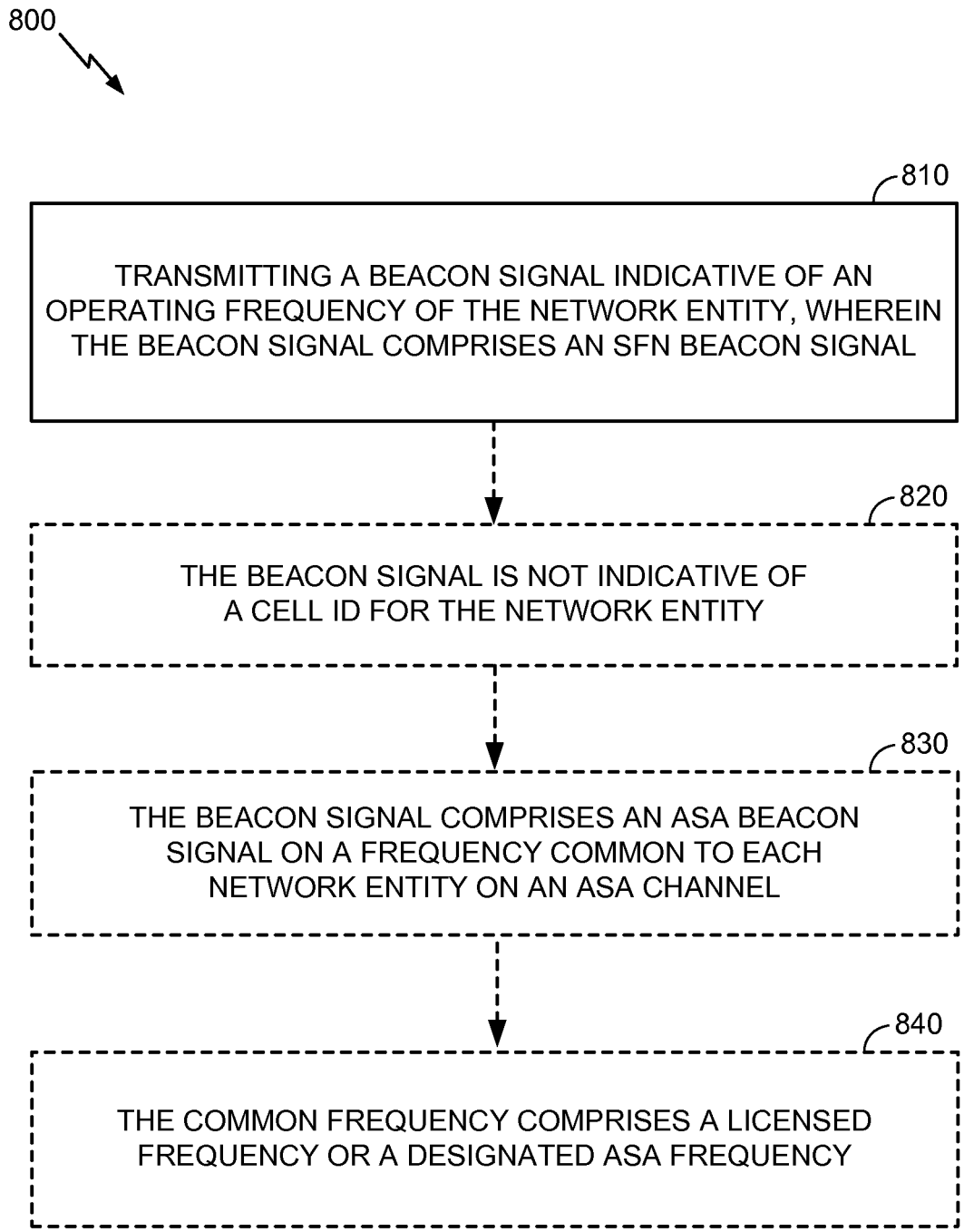
FIG. 8 illustrates an example channel discovery methodology executable by a network entity (e.g., an eNB).

In accordance with one or more aspects of the embodiments described herein, with reference to FIG. 8, there is shown a cognitive radio methodology 800, operable by a network entity (e.g., an eNB or the like) to facilitate channel discovery in cognitive LTE or the like. The method 800 may involve, at 810, transmitting a beacon signal indicative of an operating frequency of the network entity, wherein the beacon signal comprises a single frequency network (SFN) beacon signal. Blocks 820-840 illustrate optional aspects of the method 800. For example, the beacon signal may not be indicative of a cell ID for the network entity (block 820). The beacon signal may include an ASA beacon signal on a frequency common to each network entity on an ASA channel (block 830). The common frequency comprises one of a licensed frequency and a designated ASA frequency (block 840).

Figure 9:
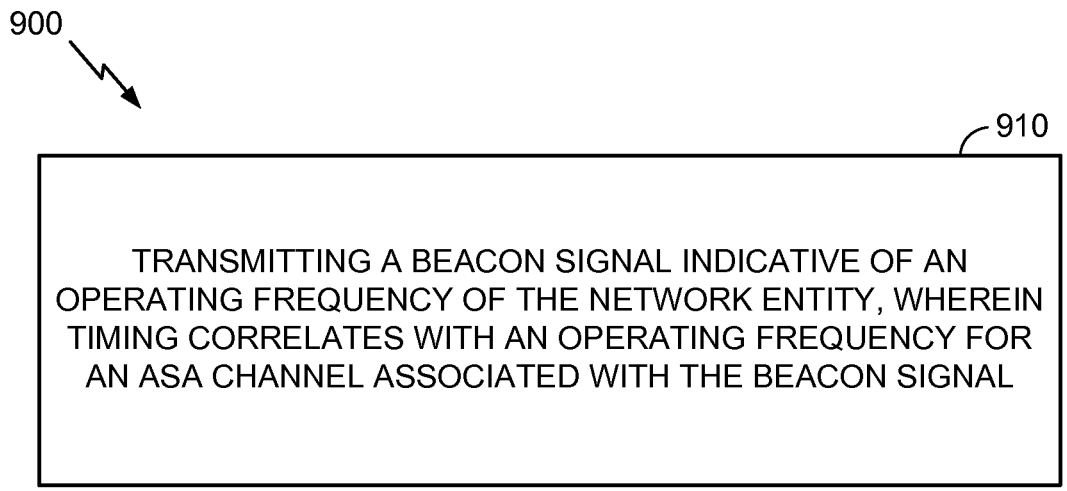
FIG. 9 illustrates another example channel discovery methodology executable by a network entity.
Figure 10:
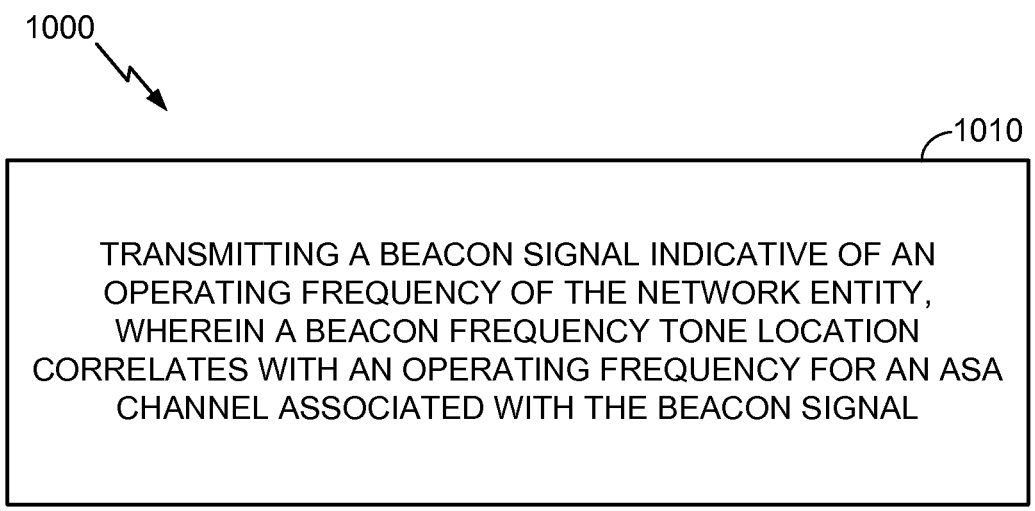
FIG. 10 illustrates yet another example channel discovery methodology executable by a network entity.

In another example, shown in FIG. 9, there is provided a cognitive radio methodology 900, operable by a network entity. The method 900 may involve, at 910, transmitting a beacon signal indicative of an operating frequency of the network entity, wherein timing correlates with an operating frequency for an ASA channel associated with the beacon signal. In yet another example, shown in FIG. 10, there is provided a cognitive radio methodology 1000, operable by a network entity, wherein the method 1000 may involve, at 1010, transmitting a beacon signal indicative of an operating frequency of the network entity, wherein a beacon frequency tone location correlates with an operating frequency for an ASA channel associated with the beacon signal.

Figure 11:
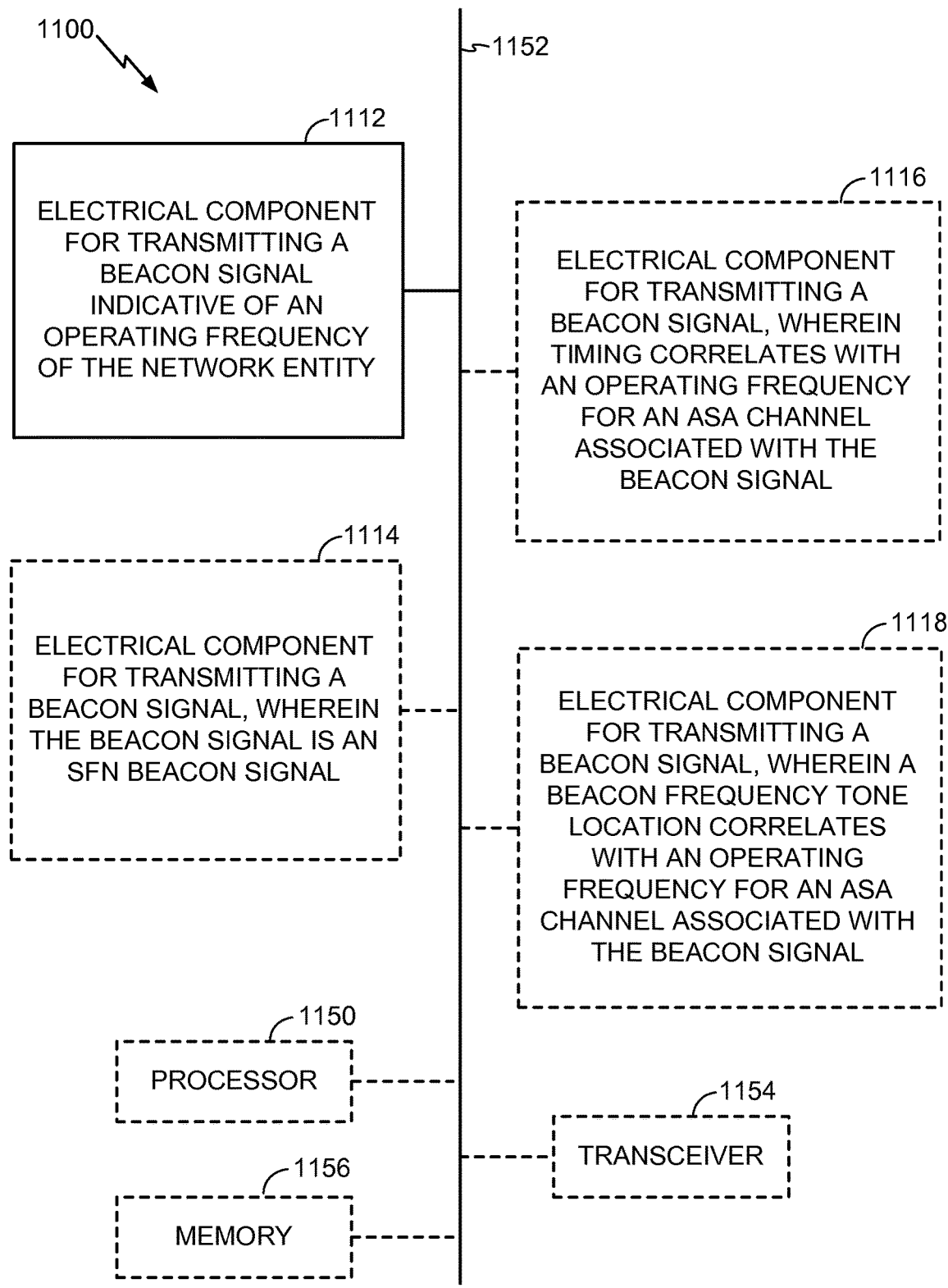
FIG. 11 shows an embodiment of an apparatus for channel discovery, in accordance with the methodologies of FIGS. 8-10.

In accordance with one or more aspects of the embodiments described herein, there are provided devices and apparatuses for channel discovery, as described above with reference to FIGS. 8-10. With reference to FIG. 11, there is provided an exemplary apparatus 1100 that may be configured as a network entity (e.g., an eNB), or as a processor or similar device/component for use within the network entity. The apparatus 1100 may include functional blocks that can represent functions implemented by a processor, software, or combination thereof (e.g., firmware). The apparatus 1100 may include an electrical component or module 1112 for transmitting a beacon signal indicative of an operating frequency of the network entity. In related aspects, the beacon signal may be/include a single frequency network (SFN) beacon signal (block 1114). In further related aspects, timing may correlate with an operating frequency for an ASA channel associated with the beacon signal (block 1116). In yet further related aspects, a beacon frequency tone location may correlate with an operating frequency for an ASA channel associated with the beacon signal (block 1118). For the sake of conciseness, the rest of the details regarding apparatus 1100 are not further elaborated on; however, it is to be understood that the remaining features and aspects of the apparatus 1100 are similar to those described above with respect to apparatus 700 of FIG. 7.

In related aspects, various additional modules and related components (not shown) may be incorporated in apparatus 1100. For example, apparatus 1100 may be configured consistently with the example WS-enabled eNB 410 illustrated in FIG. 4. In related aspects, the components 1112-1118 may be part of the processor 430, the TX data processor 414, and/or the memory 432 of the WS-enabled eNB 410. In further related aspects, the processor 430, the TX data processor 414, and/or the memory 432 may be configured to perform aspects of the methodologies described with reference to FIGS. 8-10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A channel discovery method operable by a mobile entity in a wireless communication network, comprising:
   accessing the wireless communication network on a first frequency, wherein the first frequency is associated with a licensed channel of the wireless communication network;
   detecting and measuring beacon signals associated with the wireless communication network;
   detecting an Authorized Shared Access (ASA) beacon signal on a second frequency, wherein the second frequency is common to each network entity on a given ASA channel, and further wherein the second frequency is distinct from the first frequency; and
   based on detecting the ASA beacon signal, extracting operating frequency information of ASA channels from the ASA beacon signal, wherein the ASA beacon signal comprises a single frequency network (SFN) beacon signal.

2. The method of claim 1, further comprising:
   based on being in a connected mode:
      reporting measurements of the measured beacon signals to a serving network entity;
      receiving, from the serving network entity, an inter-frequency measurement request for best ASA channel candidates; and
      performing inter-frequency measurements according to the received inter-frequency measurement request.

3. The method of claim 1, wherein the second frequency comprises one of a licensed frequency or a designated ASA frequency.

4. The method of claim 1, wherein different SFN beacon signals correspond to different public land mobile networks (PLMNs) on the given ASA channel, and wherein the different SFN beacon signals include the SFN beacon signal.

5. The method of claim 4, wherein each network entity of a given PLMN on the given ASA channel uses a same pseudorandom noise (PRN) sequence for the ASA beacon signal.

6. The method of claim 1, wherein the ASA beacon signal corresponds to one or more different public land mobile networks (PLMNs) on the given ASA channel.

7. The method of claim 6, wherein each network entity on the given ASA channel uses a different pseudorandom noise (PRN) sequence for the ASA beacon signal.

8. A channel discovery method operable by a mobile entity in a wireless communication network, comprising:
   accessing the wireless communication network on a first frequency, wherein the first frequency is associated with a licensed channel of the wireless communication network;
   detecting and measuring beacon signals associated with the wireless communication network;
   detecting an Authorized Shared Access (ASA) beacon signal on a second frequency, wherein the second frequency is common to each network entity on a given ASA channel, and further wherein the second frequency is distinct from the first frequency; and
   based on detecting the ASA beacon signal, extracting timing information of ASA channels from the ASA beacon signal, wherein the timing information correlates with an operating frequency for the ASA beacon signal.

9. The method of claim 8, further comprising:
   based on being in a connected mode:
      reporting measurements of the beacon signals to a serving network entity;
      receiving, from the serving network entity, an inter-frequency measurement request for best ASA channel candidates; and
      performing inter-frequency measurements according to the received inter-frequency measurement request.

10. The method of claim 8, wherein the second frequency comprises one of a licensed frequency or a designated ASA frequency.

11. A channel discovery method operable by a mobile entity in a wireless communication network, comprising:
   accessing the wireless communication network on a first frequency, wherein the first frequency is associated with a licensed channel of the wireless communication network;
   detecting and measuring beacon signals associated with the wireless communication network;
   detecting an Authorized Shared Access (ASA) beacon signal on a second frequency, wherein the second frequency is common to each network entity on a given ASA channel, and further wherein the second frequency is distinct from the first frequency; and
   based on detecting the ASA beacon signal, extracting a beacon frequency tone location of ASA channels from the ASA beacon signal, wherein the beacon frequency tone location correlates with an operating frequency for the given ASA channel.

12. An apparatus for channel discovery by a mobile entity in a wireless communication network, comprising:
   means for accessing the wireless communication network on a first frequency, wherein the first frequency is associated with a licensed channel of the wireless communication network;
   means for detecting and measuring beacon signals associated with the wireless communication network;

means for detecting an Authorized Shared Access (ASA) beacon signal on a second frequency, wherein the second frequency is common to each network entity on a given ASA channel, and further wherein the second frequency is distinct from the first frequency; and based on detecting the ASA beacon signal, means for extracting operating frequency information of ASA channels from the ASA beacon signal, wherein the ASA beacon signal comprises a single frequency network (SFN) beacon signal.

13. The apparatus of claim 12, wherein the operating frequency information comprises timing information that correlates with an operating frequency for the ASA beacon signal.

14. The apparatus of claim 12, wherein the operating frequency information comprises a beacon frequency tone location that correlates with an operating frequency for the given ASA channel.

15. An apparatus for channel discovery by a mobile entity in a wireless communication network, comprising:
at least one processor configured to:
access the wireless communication network on a first frequency, wherein the first frequency is associated with a licensed channel of the wireless communication network;
detect and measure beacon signals associated with the wireless communication network;
detect an Authorized Shared Access (ASA) beacon signal on a second frequency, wherein the second frequency is common to each network entity on a given ASA channel, and further wherein the second frequency is distinct from the first frequency; and
based on detecting the ASA beacon signal, extract operating frequency information of ASA channels from the ASA beacon signal, wherein the ASA beacon signal comprises a single frequency network (SFN) beacon signal; and
a memory coupled to the at least one processor for storing data.

16. The apparatus of claim 15, wherein the operating frequency information comprises timing information that correlates with an operating frequency for the ASA beacon signal.

17. The apparatus of claim 15, wherein the operating frequency information comprises a beacon frequency tone location that correlates with an operating frequency for the given ASA channel.

18. A non-transitory computer-readable medium storing instructions, the instructions comprising:
one or more instructions that, when executed by at least one processor, cause the at least one processor to:
access a wireless communication network on a first frequency, wherein the first frequency is associated with a licensed channel of the wireless communication network;
detect and measure beacon signals associated with the wireless communication network;
detect an Authorized Shared Access (ASA) beacon signal on a second frequency, wherein the second frequency is common to each network entity on a given ASA channel, and further wherein the second frequency is distinct from the first frequency; and
based on detecting the ASA beacon signal, extract operating frequency information of ASA channels from the ASA beacon signal, wherein the ASA beacon signal comprises a single frequency network (SFN) beacon signal.

19. The non-transitory computer-readable medium of claim 18, wherein the operating frequency information comprises timing information that correlates with an operating frequency for the ASA beacon signal.

20. The non-transitory computer-readable medium of claim 18, wherein the operating frequency information comprises a beacon frequency tone location that correlates with an operating frequency for the given ASA channel.

21. A channel discovery method operable by a network entity in a wireless communication network, comprising:
transmitting data on a first frequency of the wireless communication network, wherein the first frequency is associated with a licensed channel of the wireless communication network; and
transmitting, on a second frequency of the wireless communication network, an Authorized Shared Access (ASA) beacon signal indicative of an operating frequency of ASA channels of the network entity, wherein the ASA beacon signal comprises a single frequency network (SFN) beacon signal, wherein the second frequency is common to each network entity on a given ASA channel, wherein the second frequency is distinct from the first frequency, and wherein information regarding the operating frequency of the ASA channels is extracted from the ASA beacon signal by a mobile entity.

22. The method of claim 21, wherein the ASA beacon signal is not indicative of a cell ID for the network entity.

23. The method of claim 21, wherein the second frequency comprises one of a licensed frequency or a designated ASA frequency.

24. A channel discovery method operable by a network entity in a wireless communication network, comprising;
transmitting data on a first frequency of the wireless communication network, wherein the first frequency is associated with a licensed channel of the wireless communication network; and
transmitting, on a second frequency of the wireless communication network, timing information in an Authorized Shared Access (ASA) beacon signal, wherein the timing information is indicative of an operating frequency of ASA channels of the network entity, wherein the timing information correlates with an operating frequency for an ASA channel associated with the ASA beacon signal, wherein the second frequency is common to each network entity on a given ASA channel, wherein the second frequency is distinct from the first frequency, and wherein the timing information is extracted from the ASA beacon signal by a mobile entity.

25. A channel discovery method operable by a network entity in a wireless communication network, comprising;
transmitting data on a first frequency of the wireless communication network, wherein the first frequency is associated with a licensed channel of the wireless communication network; and
transmitting, on a second frequency of the wireless communication network, a beacon frequency tone location in an Authorized Shared Access (ASA) beacon signal, wherein the beacon frequency tone location is indicative of an operating frequency of ASA channels of the network entity, wherein the beacon frequency tone location correlates with an operating frequency for an ASA channel associated with the ASA beacon signal, wherein the second frequency is common to each network entity on a given ASA channel, wherein the second frequency is distinct from the first frequency, and wherein the beacon frequency tone location is extracted from the ASA beacon signal by a mobile entity.

26. An apparatus for channel discovery operable by a network entity in a wireless communication network, comprising:
   means for transmitting data on a first frequency of the wireless communication network, wherein the first frequency is associated with a licensed channel of the wireless communication network; and
   means for transmitting, on a second frequency of the wireless communication network, an Authorized Shared Access (ASA) beacon signal indicative of an operating frequency of ASA channels of the network entity, wherein the ASA beacon signal comprises a single frequency network (SFN) beacon signal, wherein the second frequency is common to each network entity on a given ASA channel, and further wherein the second frequency is distinct from the first frequency, and wherein information regarding the operating frequency of the ASA channels is extracted from the ASA beacon signal by a mobile entity.

27. The apparatus of claim 26, wherein the ASA beacon signal comprises timing information that correlates with an operating frequency associated with the ASA beacon signal.

28. The apparatus of claim 26, wherein the ASA beacon signal comprises a beacon frequency tone location that correlates with an operating frequency associated with the ASA beacon signal.

29. An apparatus for channel discovery operable by a network entity in a wireless communication network, comprising:
   at least one processor configured to:
      transmit data on a first frequency of the wireless communication network, wherein the first frequency is associated with a licensed channel of the wireless communication network; and
      transmit, on a second frequency of the wireless communication network, an Authorized Shared Access (ASA) beacon signal indicative of an operating frequency of ASA channels of the network entity, wherein the ASA beacon signal comprises a single frequency network (SFN) beacon signal, wherein the second frequency is common to each network entity on a given ASA channel, wherein the second frequency is distinct from the first frequency, and wherein information regarding the operating frequency of the ASA channels is extracted from the ASA beacon signal by a mobile entity; and
   a memory coupled to the at least one processor for storing data.

30. The apparatus of claim 29, wherein the ASA beacon signal comprises timing information that correlates with an operating frequency associated with the ASA beacon signal.

31. The apparatus of claim 29, wherein the ASA beacon signal comprises a beacon frequency tone location that correlates with an operating frequency associated with the ASA beacon signal.

32. A non-transitory computer-readable medium storing instructions, the instructions comprising:
   one or more instructions that, when executed by at least one processor, cause the at least one processor to:
      transmit data on a first frequency of a wireless communication network, wherein the first frequency is associated with a licensed channel of the wireless communication network; and
      transmit, on a second frequency of the wireless communication network, an Authorized Shared Access (ASA) beacon signal indicative of an operating frequency of ASA channels of the network entity, wherein the ASA beacon signal comprises a single frequency network (SFN) beacon signal, wherein the second frequency is common to each network entity on a given ASA channel, wherein the second frequency is distinct from the first frequency, and wherein information regarding the operating frequency of the ASA channels is extracted from the ASA beacon signal by a mobile entity.

33. The non-transitory computer-readable medium of claim 32, wherein the ASA beacon signal comprises timing information that correlates with an operating frequency associated with the ASA beacon signal.

34. The non-transitory computer-readable medium of claim 32, wherein the ASA beacon signal comprises a beacon frequency tone location that correlates with an operating frequency associated with the ASA beacon signal.

* * * * *